United States Patent [19]  [11] 4,204,750
Hilbert  [45] May 27, 1980

[54] METHOD OF CUSTOM FITTING EYEGLASS FRAMES AND ARTICLE FORMED THEREBY

[76] Inventor: James F. Hilbert, 2646 4th St. North, St. Petersburg, Fla. 33704

[21] Appl. No.: 860,692

[22] Filed: Dec. 15, 1977

Related U.S. Application Data

[63] Continuation-in-part of Ser. No. 731,028, Oct. 8, 1976, abandoned.

[51] Int. Cl.$^2$ .......................... G02C 5/02; B29C 1/02
[52] U.S. Cl. ........................................ 351/130; 29/20; 264/222
[58] Field of Search ..................... 29/20; 264/221, 222; 351/130, 131, 132

[56] References Cited

U.S. PATENT DOCUMENTS

| | | | |
|---|---|---|---|
| 2,308,200 | 1/1943 | Nerney | 29/20 |
| 2,682,196 | 6/1954 | Baldanza | 29/20 |
| 3,189,913 | 6/1965 | Hoffmaster | 351/130 |
| 3,233,956 | 2/1966 | Angelis | 351/132 |
| 3,345,737 | 10/1967 | Gordon | 264/222 |
| 3,476,468 | 11/1969 | Fortenberry | 351/130 |
| 3,701,592 | 10/1976 | Fernandez | 264/221 |

*Primary Examiner*—Horace M. Culver
*Attorney, Agent, or Firm*—Graybeal & Uhlir

[57] ABSTRACT

A method of custom fitting eyeglass frames to the nose of a wearer, which is in part performed by an optician or the like and in part performed by an eyeglass frames laboratory. The optician or the like heats a preferably horseshoe shaped wax wafer until it is moldable, then positions such on the bridge area of the wearer's nose and applies pressure thereto, bending the wafer concavely to conform its shape to that of the bridge of the nose. The eyeglass frames are then situated against the convex surface of the wafer in their normal viewing position and an imprint of the nose bridge portion of the frames is made on the outer surface of the wax wafer. Finally, the wax pattern thus formed is removed from the frames and wearer's nose and cooled to fix its shape, and the outline of eyeglass frames bridge is drawn thereon. The resulting wax pattern is then sent to an eyeglass frames laboratory and a plastic nosepiece is there fabricated by a two-step dental stone casting procedure, which renders the plastic nosepiece a precise replica of the wax pattern. The finished plastic nosepiece is returned to the optician for attachment to the eyeglass frames. With this nosepiece in position on the bridge of the wearer's nose, the optician performs the final adjustment with the eyeglass frames in the normal viewing orientation, and a quick setting adhesive or the like is used to attach the finished nosepiece to the bridge portion of the eyeglass frames.

18 Claims, 1 Drawing Figure

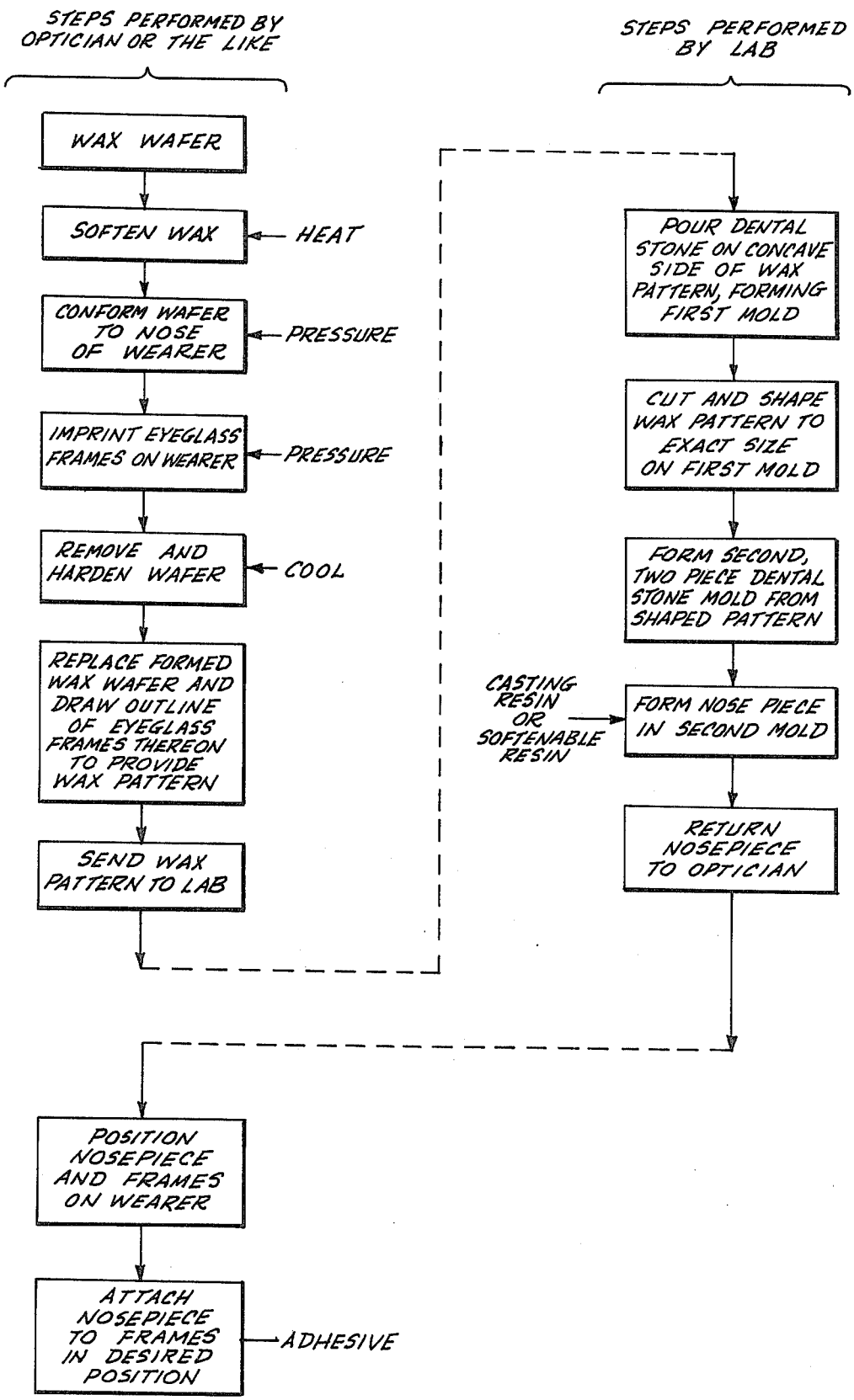

METHOD OF CUSTOM FITTING EYEGLASS FRAMES AND ARTICLE FORMED THEREBY

CROSS REFERENCE TO RELATED APPLICATION

This is a continuation-in-part of application Ser. No. 731,028, filed Oct. 8, 1976, now abandoned.

BACKGROUND OF THE INVENTION

1. Field of the Invention

This invention relates to a method of custom fitting a pair of eyeglass frames to the wearer's nose, and to the nosepiece formed in practice of such method. More particularly, the invention relates to a custom fitting technique for eyeglass frames in which an inexpensive wax wafer is heated and conformed to the wearer's nose and the frames to create a contoured pattern which can be sent to and processed by an eyeglass frames laboratory to form a permanent nosepiece which is precisely adapted to the wearer's nose and is finally aligned with the eyeglass frames while both the nosepiece and frames are in worn position.

2. Description of the Prior Art

A particular problem with prior art methods of fabricating an eyeglass frame is that it must be properly fitted to the wearer's nose to both ensure correct alignment of the eyeglass lens and to avoid discomfort caused by the necessarily small contact area between the nose and nose pad thereby causing discomfort to the wearer. Furthermore, the weight of the frames, if not properly supported by the nose pads, tends to cause the frames to slide down the wearer's nose, causing chafing and irritation resulting in considerable distress to the wearer.

Additionally, in normal use eyeglasses are repeatedly removed from and returned to their position of use with the frames placed against the nose and ears of the user. Unless the frames are returned to the same position each time, the lenses may well not be in proper position for optimal correction of vision. Erratic positioning of the frames when returned to use position will result in erratic correction with consequent decrease of sharpness and clarity of vision, frustrating the overall purpose and most important reason for wearing eyeglasses, i.e. proper eye sight correction.

Present day opticians and the like maintain a large inventory of eyeglass frames so that the wearer can select a particular style of frames and lenses. Since the frames must be properly fitted, the optician must normally carry a reasonably large selection of both styles and sizes to accommodate his customers. Additionally, it is desirable that opticians and the like be able to accurately conform the bridge portion of eyeglass frames to the wearer's facial features, and particularly the nasal structure, as quickly as possible by relatively low cost means, since the fit of the frames against the bridge of the nose is most critical for the wearer's comfort as well as proper vision correction.

Of particular interest with respect to fitted devices for holding eyeglass frames on the wearer's nose is U.S. Pat. No. 3,701,592 to Fernandez. This patent discloses a pair of spectacles provided with a nose bridge specifically contoured to conform to the upper portion of the nose of the wearer. A central portion of the bridge is made from a plastic or metal material and includes a U-shaped cavity which forms a vacuum around a portion of the nose for retaining the spectacles in their proper position. An impression of the upper nose is formed from a moldable compound applied to the inner surface of a fixture. Dental stone, in its pliable state, is then molded with the impression form, and, after setting, forms a replica of the nose. A two-part die is created incorporating the shape of the nose replica, and an internal cavity is filled with a settable plastic to form a vacuum holder piece. A particular disadvantage of the vacuum spectacle bridge taught by Fernandez is that it requires a rather large holder which extends a significant distance along both the length and width of the wearer's nose thereby detracting from the esthetic appearance of the spectacles. Additionally, the nosepiece must be initially deformed when the spectacles are positioned on the wearer's nose in order to exhaust the air from the vacuum retaining means so that the vacuum bond can be formed. Furthermore, in use, the application of suction to the nose over a prolonged period has a tendency to turn the contacted area of the nose red and to irritate the wearer's skin.

Also of interest in U.S. Pat. No. 3,043,191 to Lanski which discloses a method of fitting spectacle frames to spectacle pads. The method disclosed by the Lanski patent involves a positioning of a blank member having a pair of interconnected pads on the bridge of the wearer's nose. The blank member is formed from a moldable material, softened by heating in water, which is then formed to the shape of the nasal structure. Adhesive is then used to attach the pads to the frames of the eyeglasses.

Another method of fitting eyeglass frames with a moldable material is disclosed in U.S. Pat. No. 3,597,053, to Massman. This patent describes spectacle frames having a nose portion and a pair of temples, both of which have surfaces for enhancing the engagement between the nose and temple and ear portions of the head. The pliable material may be of the type which is either in a liquid state at ambient temperature or is a heat responsive thermoplastic substance such that it becomes malleable at temperatures slightly above ambient temperature. In FIGS. 7 and 8, an inverted U-shaped bridge segment is illustrated which is heated for softening of the thermoplastic material. In this pliable state the nosepiece is urged against the nose of the wearer causing it to conform to the contacted surface of the nose.

Also of general interest are the following U.S. Pat. Nos.:

| | |
|---|---|
| Fensky | 1,611,428 |
| Montalov-Guenard | 2,234,729 |
| Nerney | 2,308,200 |
| Moeller | 2,582,345 |
| Baldanza | 2,682,196 |
| Hoffmaster | 3,189,913 |
| Angelis | 3,233,956 |
| Gordon | 3,345,737 |
| Fartenberry | 3,476,468 |
| Olson | 3,584,939 |

SUMMARY OF THE INVENTION

According to one aspect of the invention, a pair of eyeglass frames is custom fit to the nose of a wearer by a procedure in part performed by an optician or the like and in part performed by an eyeglass frame laboratory. The optician or the like positions a wax wafer, heated as in warm water until it is moldable, on the bridge of the wearer's nose and applies pressure to conform its shape to that of the nose. The wearer's eyeglass frames are then positioned in their normal orientation of the nose and ears of the wearer and an imprint of the frames is formed on the wax wafer. Finally, the contoured wax form is removed from the wearer's nose and cooled to fix its shape. The outline of the frames in the area thereof contacted by the wax form is marked on the wax form, as by a marking pen. The shaped negative replica or pattern thus formed and marked is then processed by an eyeglass frames laboratory to form a plastic nosepiece therefrom. The nosepiece and eyeglass frames are then finally fit on the wearer by the optician or the like, with quick setting adhesive or the like being used to securely attach the nosepiece to the frames in proper position.

According to another aspect of the invention, a method of making and adapting the frames of eyeglasses is disclosed in which the nosepiece can be easily and quickly fitted to any type of spectacle frames without disturbing the original alignment by adjustment of nose pads. As a related aspect of the invention, a custom fit nosepiece is provided which has a surface contact area much larger than the contact area of conventional nosepieces, thereby spreading the weight of the frames and reducing pressure point irritation so that wearer comfort is significantly improved.

According to another aspect of the invention, a method is provided for producing a nosepiece fabricated from a resin or like material which can be either the same or different than the material from which the frames are fabricated, with the nosepiece a permanent and integral part of the frames while in use.

Another aspect of the invention involves the custom forming of a nosepiece for a pair of eyeglass frames by use of readily available and low cost materials, such as petroleum base wax, and molding plaster, such as dental stone, to initially create an accurate replica of the wearer's nasal structure and the adjacent portion of the frames, and then fabricate a precisely shaped nosepiece therefrom under controlled laboratory conditions.

These and other objects, features and advantages of the invention will be apparent from the following detailed description of various modes of practice thereof.

BRIEF DESCRIPTION OF THE DRAWING

The FIGURE is a flow diagram illustrating a method of custom fitting eyeglass frames according to the present invention.

DETAILED DESCRIPTION OF THE PREFERRED METHOD

Referring to the FIGURE, the invention is generally concerned with a method of custom fitting eyeglass frames in which the portion of the procedure concerned with an initial impression for the nosepiece and the final fitting of the spectacles frames is performed by an optician or the like, and the actual fabrication of the nosepiece is performed by an eyeglass frames laboratory from a pattern sent to the laboratory by the optician.

Rather than maintaining a large stock of eyeglass frames with a varied selection of sizes and nosepieces, the optician need only maintain an inventory of eyeglass frames which maximizes esthetic variations, but with a lesser variety of sizes. In the same manner as with heretofore known methods of fitting eyeglass frames, the patient first selects a pair of eyeglass frames according to his own particular esthetic taste. His eyesight is carefully measured on a lensometer, or other such instrument, and a prescription derived for the grinding of each corrective lens. This preparation of corrective lenses for the eyeglass frames is well-known to those skilled in the art, and it has no import with regard to the method of the instant invention.

After the specific frames have been selected by the patient, the optician employs a wax wafer to make an impression of the bridge portion of the nose of the wearer. In preferred form, the wax wafer is shaped in a somewhat circular horseshoe manner, and may be supplied to the optician from an appropriate source such as a laboratory or frames supply house. Suitably the wafers are provided in three separate sizes, e.g. $1\frac{1}{4}$", $1\frac{1}{2}$" and $1\frac{3}{4}$" in diameter, and approximately $\frac{1}{8}$" thick. These three sizes have been found to be suitable for almost all variation in patient nose structure. It should be understood, however, that the wafer can be of different shapes and dimensions, the precise size being dependent primarily on both the nose structure and the desired thickness of the final nosepiece, as will be more apparent from the following description. The material forming the wafer is suitably a thermoplastic substance, such as petroleum-base wax, and such that it is relatively nonpliable or moldable at ambient temperatures, but when heated to an elevated temperature, e.g. approximately 130°, it softens and becomes moldable and formable in response to applied finger pressure.

The processes for creating the negative pattern begins with the optician depositing one of the above described wafers in water at a temperature of approximately 130° F.

After the wafer has thus been rendered soft or pliable, the optician positions it, while still warm, on the bridge of the wearer's nose with the open end of the horseshoe shaped wafer facing downwardly. The applier's fingers can then be used to gently bend the water over the wearer's nose, and to conform its convex surface to the configuration of the bridge of the wearer's nose.

With the wafer thus placed, the selected eyeglass frames are positioned on the wearer in the proper viewing position, with the bridge portion of the frames against the still warm wafer. By applying pressure to the bridge portion of the frames, the convex outer surface of the wax wafer is imprinted with the contacting impression of the frames.

Finally, the optician removes the frames and carefully removes the resulting wax pattern from the nasal structure of the wearer. Without changing the shape of the replica, the pattern is preferably quickly cooled as in cold water (at 80° F. or less) in order that its impressed shape will be fixed without distortion. After the shape of the wax pattern has thus been fixed, it is desirable to reposition it on the nose of the wearer in order to ensure that its shape has not become distorted, and to ensure the correctness of the imprint of the frame of the glasses on the convex side of the pattern. Also, at this time, the outline of the edge of the glasses frame should be drawn on the convex side of the wax pattern to assist in the shaping and cutting of the final pattern in the laboratory, for proper esthetic appearance of the nosepiece.

The optician then sends the formed and marked wax pattern to an eyeglass frames laboratory for fabrication of the custom fitted nosepiece. In the laboratory, a soft mixture of finely divided self-setting molding composition, such as the mix commonly known as dental stone, is poured into the concave side of the wax pattern and allowed to set, forming a first mold. With the wax pattern disposed on the hardened dental stone mold, the outer edges of the wax pattern are cut and shaped, resulting in a trimmed wax pattern which is configured and dimensioned substantially to conform to the size and shape of the desired nosepiece. This procedure ensures that no distortion of the wax pattern results during the cutting and shaping the edges of the pattern along the outline marking thereon. The first dental stone mold can also be used in the final steps by the laboratory personnel as a gage to check the finished product.

During the next step performed by the laboratory personnel, the trimmed wax pattern is used to prepare a second dental stone mold, creating a two-piece die for use in the forming of the custom fitted nosepiece. The face of one-half of a split mold is first coated with a light layer of a parting agent such as the material known as jelly ray. The wax pattern is placed in position in the mold half, the mold halves are reassembled, the mold cavity is filled with molding composition, and the mixture is allowed to harden. The hardened dental stone is then separated along the parting agent layer, exposing the wax pattern. The wax pattern is then removed and the cavity left in the dental stone constitutes a precise negative of the wax pattern.

The solidified dental stone casting, which may otherwise be termed a second, two-piece dental stone mold, is now ready for the final forming operation. One suitable manner of forming the final nosepiece replica involves use of a liquid, thermosetting plastic or like material, such as CPI polyester clear casting resin mixed with MEK-P hardener, both marketed by Chemical Processors Inc. of St. Petersburg, Fla., which is poured into an opening formed at one end of the second mold, as by a conventional drill, filling the internal cavity of the mold. However, it is to be understood that other settable liquid resin materials could also be used in thus casting the nosepiece, such as acrylic polymers, polyvinyl chloride, or the like.

Another suitable method of forming the final nosepiece involves use of a heat softenable resin body of sufficient size to deform and fill the internal cavity of the two-piece mold. For example, a resin body in the form of a thin (e.g. ⅛″ thick) wafer, suitably about 1½′ in diameter, can be used, the resin body and the two-piece mold being heated to the softening temperature of the resin body, with the resin body being inserted in the lower half of the dental stone mold and the top half of the mold being put in place on the lower half to form the body into the shape of the internal cavity of the mold. The filled mold is then allowed to cool to harden the formed resin body, which is then removed from the mold, and ground and polished to form the final nosepiece. In employing a softenable material as the substance from which the final nosepiece is formed, and as will be understood, any type of resin or like material can be used which is essentially thermoplastic in nature and has a softening temperature above temperatures normally encountered during use of the nosepiece, i.e. a softening temperature of at least about 160° F. Vinyl type resins are quite suitable for the purpose, and typically involve heating of the mold and resin to a temperature of about 200° F. to mold the nosepiece. Acrylic type resins are also suitable, and typically involve heating of the mold and resin to about 350° F. during forming of the nosepiece. Other resins having the desired heat softening characteristic and utilizable for the purpose will readily occur to those in the art to which the invention is addressed.

After allowing sufficient time for the formed resin or the like to solidify, the two-piece mold is separated and the formed replica is removed. Any rough edges or surfaces on the formed plastic body are then ground and polished, forming the final nosepiece which includes respective concave and convex configurations which are the exact shape of the bridge of the wearer's nose and the bridge portion of the eyeglass frames.

As shown in FIG. 1, the nosepiece is returned to the optician or the like for final alignment on the nose of the wearer and attachment to the frames of the glasses. With the nosepiece on the bridge of the wearer's nose, the eyeglass frames are again positioned in their proper corrective position on the wearer's head. The bridge of the eyeglass frames contacts the convex surface of the nosepiece while the concave surface of the nosepiece is disposed on the wearer's nose in the supporting position. While maintaining this alignment a thin film of quick-setting adhesive, such as the cyanoacrylate ester, marketed under the trademark SUPER GLUE-3 by Woodhill Chemical Sales Corporation of Cleveland, Ohio, or the like, is placed on the contact surfaces of the eyeglass frames and the custom fitted nosepiece. Hardening of the adhesive permanently attaches the nosepiece to the frames of the spectacle in proper position to provide maximum comfort to the wearer while maintain the proper corrective orientation of the eyeglass lenses.

As will be apparent from the foregoing description, a significant aspect of the disclosed method of custom fitting eyeglass frames is that some of the steps are performed by the optician or the like, and other steps are performed in an eyeglass frames laboratory. The initial steps, quickly accomplished with the patient in the practitioner's office, do not require expensive, complicated equipment, but only a readily manufacturable inexpensive wax wafer. The intermediate steps of the method, generally requiring more time and exactness, are performed in an eyeglass frames laboratory which has the necessary raw materials and equipment to efficiently fabricate and finish the thermoset nosepiece from the wax pattern sent to it by the practitioner. The final steps of alignment and attachment of the nosepiece to the eyeglass frames, essential to maximize comfort, are performed by the practitioner with the spectacles on the patient.

From the foregoing, various additional modifications, revisions and adaptations of the method and formed article hereabove described will occur to those skilled in the art to which the invention is addressed, within the scope of the following claims.

What is claimed is:

1. The method of custom fitting eyeglass frames on the nose of a wearer, which steps are in part performed by an optician or the like and in part performed in an eyeglass frames laboratory, said method comprising:
    (1) as steps performed by the optician or the like;
        (a) heating a wax wafer to an elevated temperature sufficient to make it malleable under pressure;
        (b) positioning the heated wafer on the bridge area of the wearer's nose and applying sufficient pressure to the wafer to cause it to conform to the contour of the bridge portion of the nose;
        (c) applying the eyeglass frames against the wearer's nose in a proper viewing position and applying sufficient pressure to the frames to cause the wafer also to conform to the contour of the nose bridge portion of the frames;

(d) removing the resulting wax pattern from both the frames and the wearer's nose and cooling it to fix its shape;
(e) sending wax pattern to an eyeglass frames laboratory;
(2) as steps performed in the eyeglass frames laboratory to produce a nosepiece having a surface configuration corresponding to the nose bridge and frame bridge engaged surface configuration of the wax mold;
(f) trimming the wax pattern to conform the pattern substantially to the outline of the eyeglass frames;
(g) fabricating from molding composition a two-piece mold from dental stone casting material having an internal cavity in the shape of the trimmed wax pattern;
(h) forming a nosepiece by placing a hardenable resin material in the internal cavity of said mold, allowing sufficient time for hardening of the material, separating and removing the hardened resin material from the mold, and grinding and polishing as necessary to form the nosepiece; and
(i) returning the finished nosepiece to the optician;
(3) as steps performed by the optician or the like;
(j) positioning the formed nosepiece on the patient's nose in proper position;
(k) placing the eyeglass frames in correct viewing position against the nosepiece and, with said nosepiece in such position,
(l) permanently attaching the nosepiece to the eyeglass frames.

2. The method of claim 1, wherein the nosepiece is formed by pouring a settable liquid resin into the internal cavity of said mold, allowing sufficient time for setting of the resin, separating and removing the set resin body from the mold, and grinding and polishing the same as necessary to form the nosepiece.

3. The method of claim 2, wherein said hardenable resin material comprises polyester casting resin.

4. The method of claim 1, wherein the nosepiece is formed by heating the mold and placing in the internal cavity thereof a softenable resin body of sufficient size to fill the same, allowing the mold to cool to harden the resin body, removing the hardened resin body from the mold, and grinding and polishing the same as necessary to form the nosepiece.

5. The method of claim 4, wherein said softenable resin body is a thermoplastic resin polymer selected from the group consisting of vinyl resins and acrylic resins.

6. The method of claim 1, wherein said nosepiece is attached to the eyeglass frames by quick set adhesive.

7. An eyeglass frame having a nosepiece made and fitted to the nose of a wearer in accordance with the method of claim 1 attached thereto.

8. An eyeglass frame having a nosepiece made and fitted to the nose of a wearer in accordance with the method of claim 2 attached thereto.

9. An eyeglass frame having a nosepiece made and fitted to the nose of a wearer in accordance with the method of claim 4 attached thereto.

10. The method of custom fitting eyeglass frames on the nose of a wearer, which steps are in part performed by an optician or the like and in part performed in an eyeglass frames laboratory, said method comprising:
(1) as steps performed by the optician or the like;
(a) heating a wax wafer to an elevated temperature sufficient to make it malleable under pressure;
(b) positioning the heated wafer on the bridge area of the wearer's nose and applying sufficient pressure to the wafer to cause it to conform to the contour of the bridge portion of the nose;
(c) applying the eyeglass frames against the wearer's nose in a proper viewing position and applying sufficient pressure to the frames to cause the wafer also to conform to the contour of the nose bridge portion of the frames;
(d) removing the resulting wax pattern from both the frames and the wearer's nose and cooling it to fix its shape;
(e) marking an outline of the eyeglass frames on the wax wafer;
(f) sending the wax pattern to an eyeglass frames laboratory;
(2) as steps performed in the eyeglass frames laboratory to produce a nosepiece having a surface configuration corresponding to the nose bridge and frame bridge engaged surface configuration of the wax pattern;
(g) pouring molding composition on the concave side of the wax pattern and letting the composition harden to form a first mold;
(h) cutting and shaping the edges of the wax pattern while the pattern is supported by said first mold to conform the pattern substantially to the outline of the eyeglass frames;
(i) fabricating from molding composition a two-piece second mold having an internal cavity in the shape of the trimmed wax pattern;
(j) forming a nosepiece by filling the said second mold with a hardenable resin, hardening the resin, separating and removing the hardened resin from said second mold, and grinding and polishing the hardened resin to form the finished nosepiece; and
(k) returning the finished nosepiece to the optician or the like;
(3) as steps performed by the optician or the like;
(l) positioning the plastic nosepiece on the patient's nose in proper position;
(m) placing the eyeglass frames in correct viewing position against nosepiece; and with said nosepiece in such position
(n) attaching the nosepiece to the eyeglass frames.

11. The method of claim 10, wherein the nosepiece is formed by pouring a settable liquid resin into the internal cavity of said mold, allowing sufficient time for setting of the resin, separating and removing the set resin body from the mold, and grinding and polishing the same as necessary to form the nosepiece.

12. The method of claim 11, wherein said hardenable resin comprises polyester casting resin.

13. The method of claim 10, wherein the nosepiece is formed by heating the mold and placing in the internal cavity thereof a softenable resin body of sufficient size to fill the same, allowing the mold to cool to harden the resin body, removing the hardened resin body from the mold, and grinding and polishing the same as necessary to form the nosepiece.

14. The method of claim 13, wherein said softenable resin body is a thermoplastic resin polymer selected from the group consisting of vinyl resins and acrylic resins.

15. The method of claim 10, wherein said nosepiece is attached to the eyeglass frames by quick set adhesive.

16. An eyeglass frame having a nosepiece made and fitted to the nose of a wearer in accordance with the method of claim 10 attached thereto.

17. An eyeglass frame having a nosepiece made and fitted to the nose of a wearer in accordance with the method of claim 11 attached thereto.

18. An eyeglass frame having a nosepiece made and fitted to the nose of a wearer in accordance with the method of claim 13 attached thereto.

* * * * *